US008608462B2

(12) United States Patent
Taema

(10) Patent No.: US 8,608,462 B2
(45) Date of Patent: Dec. 17, 2013

(54) MOTOR STATOR AND ROTARY COMPRESSOR

(75) Inventor: Yoshihiro Taema, Kanagawa (JP)

(73) Assignee: Fujitsu General Limited, Kanagawa (JP)

( * ) Notice: Subject to any disclaimer, the term of this patent is extended or adjusted under 35 U.S.C. 154(b) by 173 days.

(21) Appl. No.: 13/074,448

(22) Filed: Mar. 29, 2011

(65) Prior Publication Data

US 2011/0243768 A1 Oct. 6, 2011

(30) Foreign Application Priority Data

Mar. 31, 2010 (JP) ................................ 2010-082622

(51) Int. Cl.
*F04B 35/04* (2006.01)
(52) U.S. Cl.
USPC .............. 417/423.7; 417/410.1; 310/216.115; 310/194; 310/260
(58) Field of Classification Search
USPC ................ 310/216.115, 194, 260; 417/410.1, 417/423.7, 902
See application file for complete search history.

(56) References Cited

U.S. PATENT DOCUMENTS

| | | | | |
|---|---|---|---|---|
| 4,075,522 | A | * | 2/1978 | Hoffman ........................ 310/214 |
| 4,603,273 | A | * | 7/1986 | McDonald ....................... 310/89 |
| 4,765,054 | A | * | 8/1988 | Sauerwein et al. ............. 29/596 |
| 5,398,397 | A | * | 3/1995 | Johnson .......................... 29/596 |
| 6,533,558 | B1 | * | 3/2003 | Matsumoto et al. ........ 417/410.3 |
| 7,414,347 | B2 | * | 8/2008 | Wang et al. ................... 310/260 |
| 7,936,116 | B2 | * | 5/2011 | Asou et al. .................... 310/410 |

FOREIGN PATENT DOCUMENTS

| | | |
|---|---|---|
| JP | 2008-167516 | 7/2008 |
| JP | 2009-177971 | 8/2009 |

OTHER PUBLICATIONS

Machine Translation JP-2008167516.*
Japanese Office Action issued in Application No. 2010-082622 dated Oct. 1, 2013.

* cited by examiner

*Primary Examiner* — Charles Freay
*Assistant Examiner* — Christopher Bobish
(74) *Attorney, Agent, or Firm* — McDermott Will & Emery LLP

(57) ABSTRACT

According to one embodiment, a motor stator includes a substantially cylindrical stator iron core and insulators. The stator iron core includes a yoke, teeth, and U-shaped grooves. The U-shaped grooves are formed on the circumference of the yoke in the axial direction. The insulators each include an outer circumference wall, hoisting drums, inner guards, and at least three engagement claws. The engagement claws are located spaced apart in the circumferential direction on the outside of the outer circumference wall and fitted in axial-direction ends of the U-shaped grooves, respectively. One of the engagement claws is arranged such that a first circumferential-direction side portion of the engagement claw is in contact with a first side wall of one U-shaped groove. Another is arranged such that a second circumferential-direction side portion of the engagement claw is in contact with a second side wall of another U-shaped groove.

4 Claims, 5 Drawing Sheets

MOTOR STATOR AND ROTARY COMPRESSOR

CROSS-REFERENCE TO RELATED APPLICATION(S)

This application is based upon and claims the benefit of priority of the prior Japanese Patent Application No. 2010-082622, filed on Mar. 31, 2010, the entire contents of which are incorporated herein by reference.

FIELD

The embodiments discussed herein are directed to a rotary compressor that compresses refrigerant and discharges the compressed refrigerant and a stator of a motor built in the rotary compressor.

BACKGROUND

A conventionally known motor is provided with a rotor and a stator that is located on the outside of the rotor in the radial direction. The stator includes a stator core, insulators assembled with both axial-direction end surfaces of the stator core, respectively, and a coil wound around the stator core and the insulators. The stator core and the insulators are provided with a wrong assembly prevention mechanism that prevents the insulators from being wrongly assembled with the end surfaces of the stator core. The wrong assembly prevention mechanism prevents the wrong assembly of each insulator with respect to a circumferential position on each end surface of the stator core.

For example, Japanese Laid-open Patent Publication No. 2008-167516 discloses a conventional technology related to such a wrong assembly prevention mechanism. The wrong assembly prevention mechanism has a plurality of engagement holes provided to the stator core and a plurality of engagement claws provided to the insulators. The engagement claws engage the engagement holes, respectively. There are at least three engagement holes and engagement claws. All the engagement claws differ in shape from one another, while all the engagement holes differ in shape from one another correspondingly to the shapes of the engagement claws. Alternatively, the center angles between adjacent pairs of the engagement claws differ from one another, while the center angles between adjacent pairs of the engagement holes differ from one another correspondingly to the center angles between adjacent pairs of the engagement claws.

With the conventional technology, there are a plurality of engagement holes provided to the stator core and a plurality of engagement claws provided to the insulators that engage the engagement holes, respectively. When a winding wire is wound around the stator core and the insulators by a winding machine, a nozzle of the winding machine moves in the circumferential direction as passing through a slot upward or downward and moves to the next slot. At this time, if a circumferential force acts on the insulator due to the tension of the winding wire, the insulator is not displaced in the circumferential direction with respect to the stator core.

With the conventional technology, however, the stator core is provided with the engagement holes dedicated to engage the engagement claws, which increases the fabrication cost of the stator core.

SUMMARY

According to an aspect of an embodiment, a motor stator includes a substantially cylindrical stator iron core and insulators. The stator iron core includes a ring-like yoke, teeth, and a plurality of U-shaped grooves. The teeth radially extend from the yoke toward the center. The U-shaped grooves are formed on the circumference of the yoke in the axial direction. The insulators, as insulating coatings on axial-direction ends of the stator iron core, includes a ring-like outer circumference wall, a plurality of hoisting drums, inner guards, and at least three engagement claws. The hoisting drums radially extend from the outer circumference wall toward the center. The inner guards extend from inner ends of the hoisting drums in the axial direction, respectively. The engagement claws are located spaced apart in the circumferential direction on the outside of the outer circumference wall and fitted in axial-direction ends of the U-shaped grooves, respectively. One of the engagement claws is arranged such that a first circumferential-direction side portion of the engagement claw is in contact with a first side wall of one of the U-shaped grooves. Another one of the engagement claws is arranged such that a second circumferential-direction side portion of the engagement claw is in contact with a second side wall of another one of the U-shaped grooves.

According to another aspect of an embodiment, a rotary compressor includes a housing that houses a motor including a motor stator and a refrigerant gas compressor driven by the motor. The motor stator includes a substantially cylindrical stator iron core and insulators. The stator iron core includes a ring-like yoke, teeth, and a plurality of U-shaped grooves. The teeth radially extend from the yoke toward the center. The U-shaped grooves are formed on the circumference of the yoke in the axial direction. The insulators, as insulating coatings on axial-direction ends of the stator iron core, includes a ring-like outer circumference wall, a plurality of hoisting drums, inner guards, and at least three engagement claws. The hoisting drums radially extend from the outer circumference wall toward the center. The inner guards extend from inner ends of the hoisting drums in the axial direction, respectively. The engagement claws are located spaced apart in the circumferential direction on the outside of the outer circumference wall and fitted in axial-direction ends of the U-shaped grooves, respectively. One of the engagement claws is arranged such that a first circumferential-direction side portion of the engagement claw is in contact with a first side wall of one of the U-shaped grooves. Another one of the engagement claws is arranged such that a second circumferential-direction side portion of the engagement claw is in contact with a second side wall of another one of the U-shaped grooves. The U-shaped grooves of the stator iron core serve as return passages of refrigerant oil lubricating the refrigerant gas compressor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE EMBODIMENT

Exemplary embodiments of the present invention will be described in detail with reference to the accompanying drawings.

Figure 1:
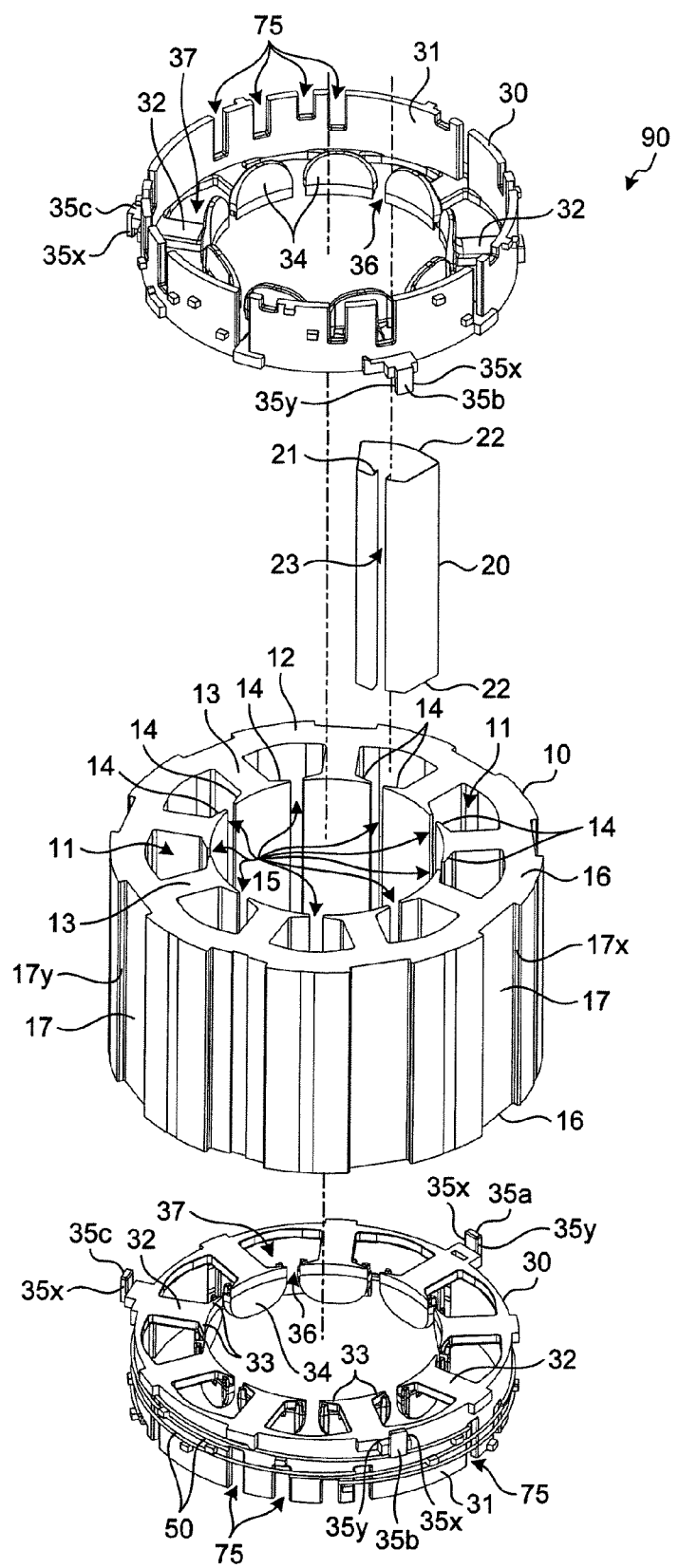
FIG. 1 is an exploded perspective view of a motor stator according to an embodiment.
Figure 2:
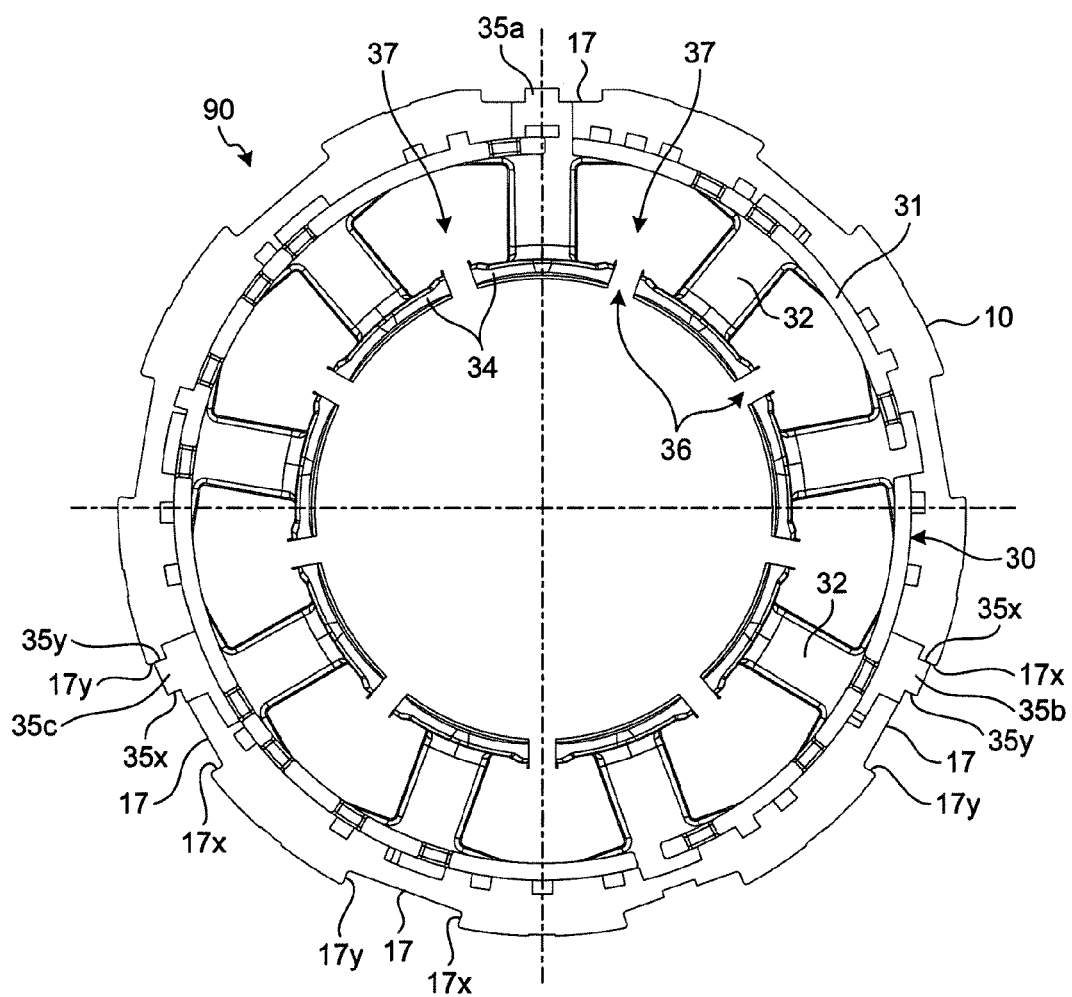
FIG. 2 is a plan view of the motor stator of the embodiment.
Figure 3:
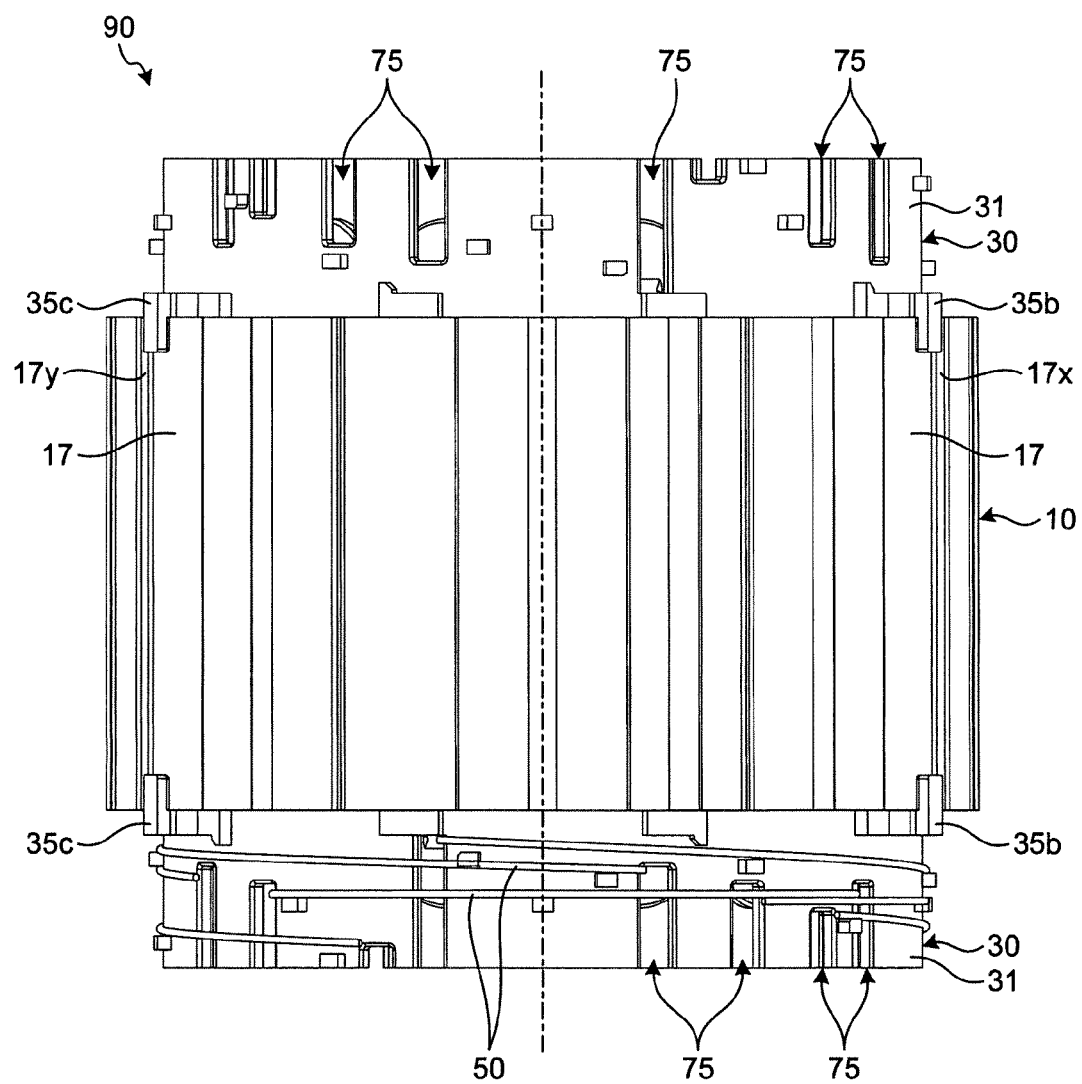
FIG. 3 is a side view of the motor stator of the embodiment.
Figure 4:
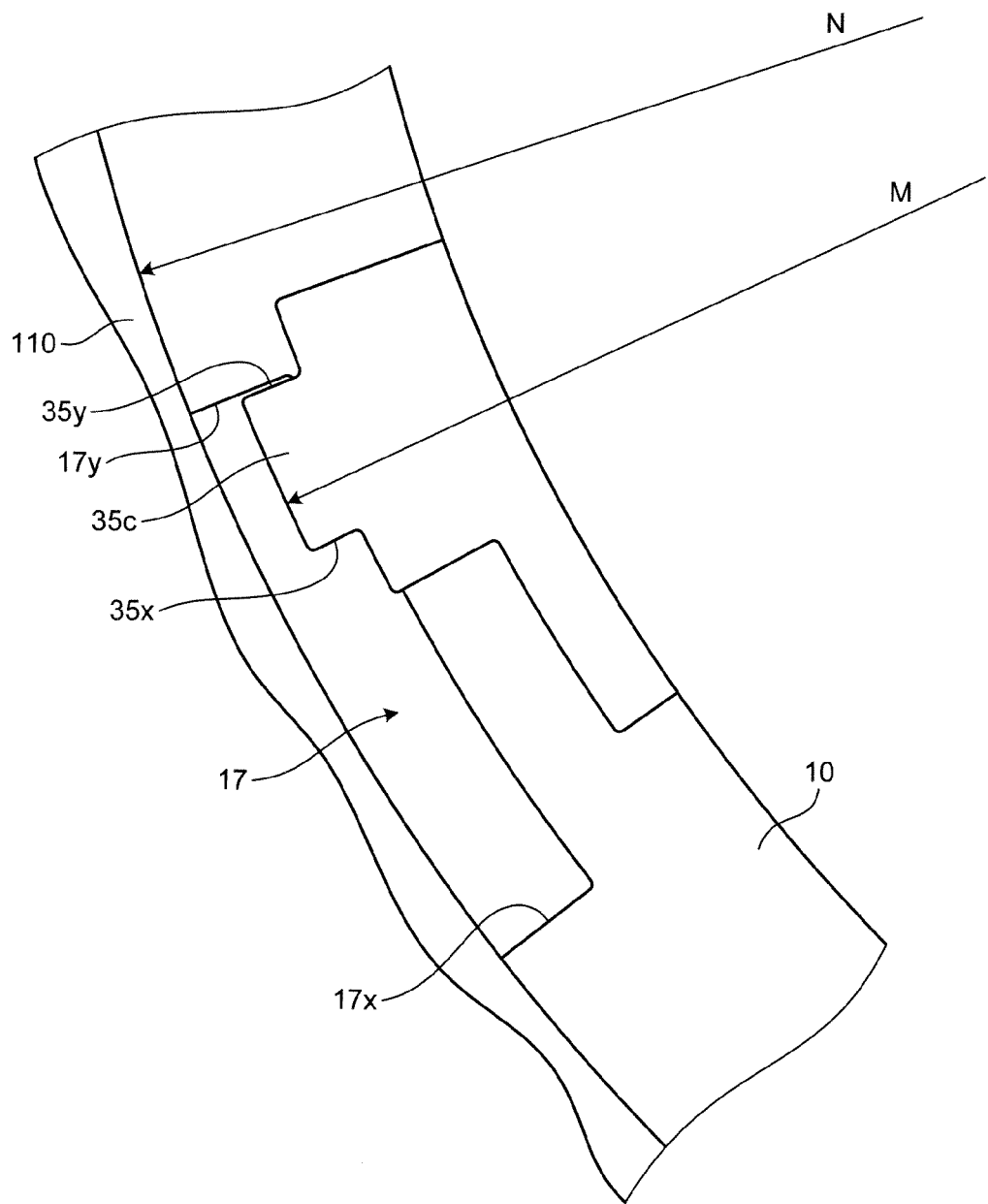
FIG. 4 is a partial enlarged view of the engagement between a U-shaped groove of a stator iron core and an engagement claw of an insulator of the embodiment.
Figure 5:
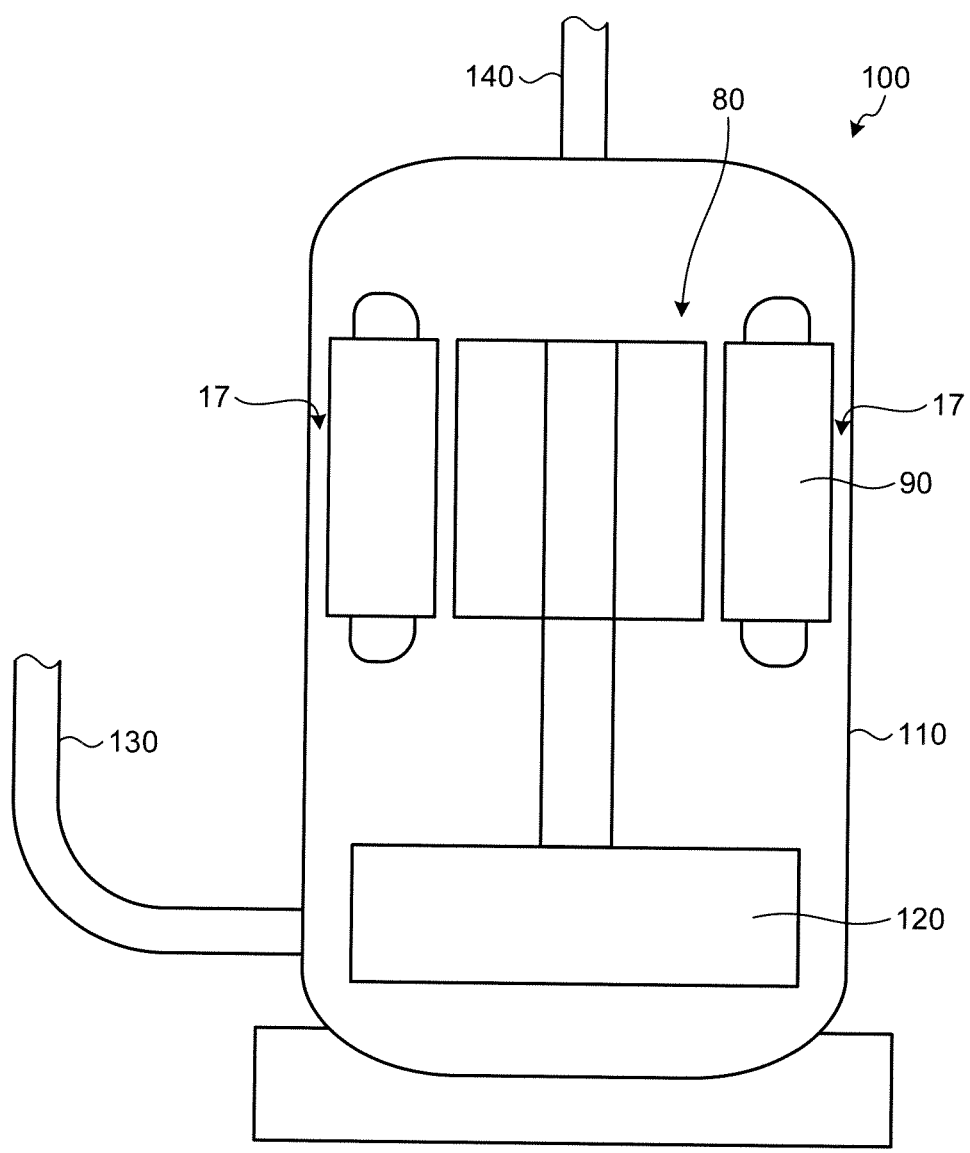
FIG. 5 is a schematic cross-sectional view of a rotary compressor of the embodiment.

FIG. 1 is an exploded perspective view of a motor stator according to an embodiment. FIG. 2 is a plan view of the motor stator of the embodiment. FIG. 3 is a side view of the motor stator of the embodiment. FIG. 4 is a partial enlarged view of the engagement between a U-shaped groove of a stator iron core and an engagement claw of an insulator of the embodiment. FIG. 5 is a schematic cross-sectional view of a rotary compressor of the embodiment.

As illustrated in FIG. 1, a motor stator 90 of the embodiment is configured to be built in a rotary compressor 100 (see FIG. 5) that compresses refrigerant and discharges the compressed refrigerant. The motor stator 90 includes a stator iron core 10, an insulating film 20, and two insulators 30, 30. The insulating film 20 is inserted in a slot 11 of the stator iron core 10 to insulate between the slot 11 and a coil (not illustrated). The insulators 30, 30 includes upper and lower insulators that are provided to both axial-direction ends 16, 16 of the stator iron core 10, respectively, to insulate between the axial-direction ends 16, 16 and the coil.

The stator iron core 10 is made of a magnetic steel plate punched into rings, which are stacked to form substantially a cylindrical shape. The stator iron core 10 includes a ring-like yoke 12, teeth 13, edges 14, and a plurality of (nine) shallow-bottomed U-shaped grooves 17. The teeth 13 extend from the yoke 12 toward the center. The edges 14 extend from the teeth 13 in the circumferential direction. The U-shaped grooves 17 are formed on the circumference of the yoke 12 in the axial direction and serve as return passages of refrigerant and refrigerant oil in the rotary compressor 100. The U-shaped grooves 17 each include side walls 17x and 17y. The side walls 17x and 17y extend in the redial direction from both circumferential-direction ends of the bottom of the U-shaped groove 17 extending in the axial direction, respectively. In the plan view of the motor stator 90 illustrated in FIG. 2, the side wall 17x located counterclockwise from the center of the bottom of the U-shaped groove 17 is referred to as a first side wall, while the side wall 17y located clockwise is referred to as a second side wall.

The slot 11 is formed as a fan-shaped space surrounded by the yoke 12, the teeth 13, and the edges 14. A slot opening 15 is formed between an opposing pair of the edges 14.

As illustrated in FIG. 1, the insulating film 20 is made of a polyester film or the like, and is bent into a cylinder having a fan-shaped cross section to be in close contact with the inner surface of the slot 11. Both circumferential-direction ends of the insulating film 20 are bent toward the inside of the cylinder to form bent portions 21. A film opening 23 is formed between the bent portions 21. The film opening 23 has a width equal to or wider than the slot opening 15. The insulating file 20 is longer than the stator iron core 10 in the axial direction. Accordingly, when the insulating film 20 is inserted in the slot 11, an axial-direction end 22 of the insulating film 20 protrudes from the axial direction end 16 of the stator iron core 10.

The insulating film 20 need not necessarily be made of a polyester film, and may be made of various materials depending on a machine to which the motor is applied. For example, if the motor is applied to a compressor that compresses refrigerant, a flame-proof insulating film, such as a polyphenylene sulfide film, an insulating film made of aramid fiber, etc., is preferably used instead of a polyester film.

As illustrated in FIGS. 1 to 3, the insulators 30 are each formed into a short cylinder by resin molding. The insulator 30 includes an outer circumference wall 31, hoisting drums 32, insulator edges 33, inner guards 34, and three engagement claws 35a, 35b, and 35c. The outer circumference wall 31 is located on the yoke 12 of the stator iron core 10. The hoisting drums 32 radially extend from the outer circumference wall 31 on the stator iron core 10 side (lower side) toward the center (inside) and covers the teeth 13 of the stator iron core 10. The insulator edges 33 extend from the inner ends of the hoisting drums 32 in the circumferential direction. The inner guards 34 are provided to the insulator edges 33 on the side opposite the stator iron core 10 (i.e., the inner guards 34 extend from the inner ends of the hoisting drums 32 in the axial direction). The engagement claws 35a, 35b, and 35c are located spaced apart in the circumferential direction on the outside of the outer circumference wall 31 on the stator iron core 10 side (lower side). The engagement claws 35a, 35b, and 35c are fitted in the axial-direction ends of the U-shaped grooves 17, respectively. The insulators 30 serves as insulating coatings on the axial-direction ends 16, 16 of the stator iron core 10. There may be four or more engagement claws. The engagement claws 35a, 35b, and 35c each include two side portions 35x and 35y. In the plan view of the motor stator 90 illustrated in FIG. 2, the side portion 35x located counterclockwise is referred to as a first circumferential side portion, while the side portion 35y located clockwise is referred to as a second circumferential side portion.

An insulator slot 37 and an insulator opening 36 are formed in substantially the same shape as the slot 11 and the slot opening 15 of the stator iron core 10, respectively, such that they are surrounded by the outer circumference wall 31 on the stator iron core 10 side, the hoisting drums 32, and the insulator edges 33.

A slit 75 formed in the outer circumference wall 31 is used to pass through a neutral wire and a crossover 50 of the coil and also to thin the outer circumference wall 31. As illustrated in FIG. 4, regarding the engagement claws 35a, 35b, and 35c, the outer diameter M of the end is smaller than the outer diameter N of the stator iron core 10 (i.e., the inner diameter of a housing 110 of the rotary compressor 100) and the circumferential-direction width is smaller than the width of the U-shaped grooves 17 such that the engagement claws 35a, 35b, and 35c are located in the return passages (the U-shaped grooves 17) of refrigerant and refrigerant oil in the housing 110. Accordingly, there is a space between the end of each of the engagement claws 35a, 35b, and 35c and the inner wall of the housing 110 and at least either between the first circumferential-direction side portion 35x of each of the engagement claws 35a, 35b, and 35c and the first side wall 17x of the U-shaped groove 17 or between the second circumferential-direction side portion 35y and the second side wall 17y. Thus, the refrigerant oil is not prevented from flowing down along the inner wall of the housing 110.

A description will be given of a characteristic structure of the insulator 30 of the embodiment. The insulator 30 is arranged such that one of the engagement claws 35a, 35b, and 35c, for example, the engagement claw 35b is located with the first circumferential-direction side portion 35x in contact with the first side wall 17x of one of the U-shaped grooves 17, the engagement claw 35c is located with the second circumferential-direction side portion 35y in contact with the second side wall 17y of another one of the U-shaped grooves 17, and the engagement claw 35a is located in the circumferential-direction center of still another one of the U-shaped grooves 17. Using the engagement claw 35a located in the circumferential-direction center of the U-shaped groove 17 as a reference, among the teeth 13 and the hoisting drums 32, those near the engagement claw 35a can be set as where the coil starts winding to a winding machine without error.

The engagement claws 35b and 35c arranged as above are locked because the first circumferential-direction side portion 35x of the engagement claw 35b is in contact with the first side wall 17x of one of the U-shaped grooves 17, and the second circumferential-direction side portion 35y of the engagement claw 35c is in contact with the second side wall 17y of another one of the U-shaped grooves 17. Accordingly, when a nozzle of the winding machine moves in the circumferential direction as passing through the slot 11 upward or downward or moves to the next slot 11 to wind a winding wire around the teeth 13 of the stator iron core 10 via the insulators 30 and the insulating film 20 by the winding machine, if a circumferential force acts on the insulator 30 due to the tension of the winding wire, the insulator 30 is not displaced in the circumferential direction with respect to the stator iron core 10.

Besides, the engagement claws 35b and 35c (or the three engagement claws 35a, 35b, and 35c) are located at different positions in the U-shaped grooves 17. Accordingly, the upper and lower insulators 30, 30 can be aligned in the circumferential direction by visually checking the engagement claws 35b and 35c (and 35a) from the side of the motor stator 90.

As described above, in the motor stator 90 according to the embodiment, the insulator 30 is not displaced in the circumferential direction when the coil is wound. Thus, insulation failure can be prevented. Moreover, since the existing U-shaped grooves 17 are used to lock the engagement claws 35b and 35c, there is no increase in the fabrication cost of the stator iron core 10.

As illustrated in FIG. 5, by installing a motor 80 including the motor stator 90 of the embodiment and a refrigerant gas compressor 120 driven by the motor 80 in the housing 110, the rotary compressor 100 can be obtained. The rotary compressor 100 sucks in a low-pressure refrigerant gas from an accumulator (not illustrated) through a low-pressure communication pipe 130. The rotary compressor 100 then compresses the refrigerant gas in the refrigerant gas compressor 120 and discharges the compressed gas from a discharge pipe 140. In the rotary compressor 100 including the motor stator 90 of the embodiment, the U-shaped grooves 17 of the stator iron core 10 serve as return passages of refrigerant oil lubricating the refrigerant gas compressor 120.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A motor stator comprising:
   a substantially cylindrical stator iron core including:
      a ring-like yoke,
      teeth that radially extend from the yoke toward a center, and
      a plurality of U-shaped grooves, including a first, second and third U-shaped grooves, that are formed on a circumference of the yoke in an axial direction and configured as return passages of refrigerant oil; and
   insulators as insulating coatings on axial-direction ends of the stator iron core, the insulators each including:
      a ring-like outer circumference wall,
      a plurality of hoisting drums that radially extend from the outer circumference wall toward a center,
      inner guards that extend from inner ends of the hoisting drums in the axial direction, respectively, and
      at least three engagement claws, including a first, second and third engagement claws, that are located spaced apart in a circumferential direction on outside of the outer circumference wall and fitted in axial-direction ends of the U-shaped grooves, respectively, each of the engagement claws having circumferential-direction width smaller than a width of a respective U-shaped groove to fit in,
   wherein the first engagement claw is arranged such that a first circumferential-direction side portion of the first engagement claw is in contact with a first side wall of the first U-shaped groove leaving a space between a second circumferential-direction side portion of the first engagement claw and a second side wall of the first U-shaped groove, and
   the second engagement claw is arranged such that a second circumferential-direction side portion of the engagement claw is in contact with a second side wall of the second U-shaped groove leaving a space between a first circumferential-direction side portion of the second engagement claw and a first side wall of the second U-shaped groove.

2. The motor stator according to claim 1, wherein
   the insulators include upper and lower insulators, and
   the third engagement claw is located in a circumferential-direction center of third U-shaped groove and is used as a reference to align the upper and lower insulators in the circumferential direction or to start winding a coil.

3. A rotary compressor comprising a housing that houses a motor including a motor stator and a refrigerant gas compressor driven by the motor, the motor stator including:
   a substantially cylindrical stator iron core including:
      a ring-like yoke,
      teeth that radially extend from the yoke toward a center, and
      a plurality of U-shaped grooves, including a first and second U-shaped grooves, that are formed on a circumference of the yoke in an axial direction; and
   insulators as insulating coatings on axial-direction ends of the stator iron core, the insulators each including:
      a ring-like outer circumference wall,
      a plurality of hoisting drums that radially extend from the outer circumference wall toward a center,
      inner guards that extend from inner ends of the hoisting drums in the axial direction, respectively, and
      at least three engagement claws, including a first and second engagement claws, that are located spaced apart in a circumferential direction on outside of the outer circumference wall and fitted in axial-direction ends of the U-shaped grooves, respectively, each of the engagement claws having circumferential-direction width smaller than width of a respective U-shaped groove to fit in,
   wherein the first engagement claw is arranged such that a first circumferential-direction side portion of the first engagement claw is in contact with a first side wall of the first U-shaped groove leaving a space between a second circumferential-direction side portion of the first engagement claw and a second side wall of the first U-shaped groove, the second engagement claw is arranged such that a second circumferential-direction side portion of the second engagement claw is in contact with a second side wall of the second U-shaped groove leaving a space between a first circumferential-direction side portion of the second engagement claw and a first side wall of the second U-shaped groove, and the U-shaped grooves of the stator iron core serve as return passages of refrigerant oil lubricating the refrigerant gas compressor.

4. The rotary compressor according to claim 3, wherein an outer diameter of an end of the engagement claws is smaller than an inner diameter of the housing.

* * * * *